US010169372B2

(12) United States Patent
Bleizeffer et al.

(10) Patent No.: US 10,169,372 B2
(45) Date of Patent: Jan. 1, 2019

(54) CONTROL FOR RAPIDLY EXPLORING RELATIONSHIPS IN DENSELY CONNECTED NETWORKS

(71) Applicant: International Business Machines Corporation, Armonk, NY (US)

(72) Inventors: Terry M. Bleizeffer, Durham, NC (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 14/056,180

(22) Filed: Oct. 17, 2013

(65) Prior Publication Data
US 2014/0189553 A1 Jul. 3, 2014

Related U.S. Application Data

(63) Continuation of application No. 13/728,461, filed on Dec. 27, 2012.

(51) Int. Cl.
G06F 3/048 (2013.01)
G06F 17/30 (2006.01)

(52) U.S. Cl.
CPC .... *G06F 17/30265* (2013.01); *G06F 17/3028* (2013.01)

(58) Field of Classification Search
None
See application file for complete search history.

(56) References Cited

U.S. PATENT DOCUMENTS

| 6,448,987 B1 | 9/2002 | Easty et al. | |
| 2006/0048076 A1* | 3/2006 | Vronay | G06F 3/0482 715/850 |
| 2006/0069603 A1 | 3/2006 | Williams et al. | |
| 2007/0033518 A1* | 2/2007 | Kenna | G06F 17/211 715/220 |
| 2008/0059913 A1* | 3/2008 | Burtner | G06F 3/0482 715/854 |
| 2008/0229245 A1* | 9/2008 | Ulerich | G06F 3/0482 715/834 |

(Continued)

FOREIGN PATENT DOCUMENTS

| CN | 101398851 | 4/2009 |
| CN | 101535943 | 9/2009 |

OTHER PUBLICATIONS

"U.S. Appl. No. 13/728,461 Office Action", dated Oct. 6, 2014, 12 pages.

(Continued)

Primary Examiner — William C Trapanese
(74) Attorney, Agent, or Firm — DeLizio Law, PLLC

(57) ABSTRACT

Some embodiments of the inventive subject matter include presenting a circular user interface, wherein the circular user interface contains data fields and data field elements consistent with a data set. A visual representation of the data set is presented. User input is received via the circular user interface, wherein the user input indicates a reorganization of the visual representation of the data set. The circular user interface is presented consistent with the user input and the visual representation of the data set consistent with the reorganization of the visual representation of the data set is presented.

10 Claims, 23 Drawing Sheets

(56) References Cited

U.S. PATENT DOCUMENTS

| | | |
|---|---|---|
| 2009/0327963 A1 | 12/2009 | Mouilleseaux et al. |
| 2011/0055760 A1 | 3/2011 | Drayton et al. |
| 2011/0219321 A1* | 9/2011 | Gonzalez Veron ..... G06F 3/048 715/764 |
| 2012/0042283 A1* | 2/2012 | Tuesta ................. G06F 3/0482 715/834 |
| 2012/0324383 A1* | 12/2012 | Tremblay .............. G06F 3/0482 715/765 |
| 2013/0104079 A1 | 4/2013 | Yasui et al. |
| 2014/0189559 A1 | 7/2014 | Bleizeffer et al. |

OTHER PUBLICATIONS

"U.S. Appl. No. 13/728,461 Final Office Action", dated Apr. 7, 2015, 12 pages.

"CN Application No. 201310627312.0 Office Action", dated Sep. 29, 2016, 8 pages.

* cited by examiner

200 ↱  202  204

| Person | Place | Date | Photo |
|---|---|---|---|
| Janice | Austin | 1995 | 1 |
| | | 2010 | 4 |
| | Indianapolis | 1995 | 9 |
| | | 2000 | 10 |
| Jenny | Austin | 2000 | 2 |
| | Baton Rouge | 2005 | 5 |
| | Indianapolis | 1995 | 8 |
| | | 2000 | 10 |
| Katie | Austin | 1995 | 1 |
| | | 2000 | 2 |
| | Baton Rouge | 2010 | 6 |
| | | | 7 |
| | Indianapolis | 1995 | 8 |
| | | 2000 | 10 |
| [none] | Austin | 2005 | 3 |

| Date | Place | Person | Photo |
|---|---|---|---|
| 1995 | Austin | Janice | 1 |
| | | Katie | |
| | Indianapolis | Janice | 9 |
| | | Jenny | 8 |
| | | Katie | |
| 2000 | Austin | Jenny | 2 |
| | | Katie | |
| | Indianapolis | Janice | 10 |
| | | Jenny | |
| | | Katie | |
| 2005 | Austin | [none] | 3 |
| | Baton Rouge | Jenny | 5 |
| 2010 | Austin | Janice | 4 |
| | Baton Rouge | Katie | 6 |
| | | | 7 |

| Photo | Person | Place | Date |
|---|---|---|---|
| 1 | Janice / Katie | Austin | 1995 |
| 2 | Jenny / Katie | Austin | 2000 |
| 3 | [none] | Austin | 2005 |
| 4 | Janice | Austin | 2010 |
| 5 | Jenny | Baton Rouge | 2005 |
| 6 | Katie | Baton Rouge | 2010 |
| 7 | | | |
| 8 | Jenny / Katie | Indianapolis | 1995 |
| 9 | Janice | Indianapolis | |
| 10 | Jenny / Katie | | 2000 |

| Place | Date | Photo | Person |
|---|---|---|---|
| Austin | 1995 | 1 | Janice |
| | | | Katie |
| | 2000 | 2 | Jenny |
| | | | Katie |
| | 2005 | 3 | [none] |
| | 2010 | 4 | Janice |
| Baton Rouge | 2005 | 5 | Jenny |
| | 2010 | 6 | Katie |
| | | 7 | |
| Indianapolis | 1995 | 8 | Jenny |
| | | | Katie |
| | | 9 | Janice |
| | 2000 | 10 | Jenny |
| | | | Katie |
| | | | Janice |

FIG. 11

| Place | Date | Photo | Person |
|---|---|---|---|
| Indianapolis | 1995 | 8 | Jenny |
| | | | Katie |
| | | 9 | Janice |
| | 2000 | 10 | Jenny |
| | | | Katie |
| | | | Janice |
| Baton Rouge | 2005 | 5 | Jenny |
| | 2010 | 6 | Katie |
| | | 7 | |
| Austin | 1995 | 1 | Janice |
| | | | Katie |
| | 2000 | 2 | Jenny |
| | | | Katie |
| | 2005 | 3 | {none} |
| | 2010 | 4 | Janice |

FIG. 20

CONTROL FOR RAPIDLY EXPLORING RELATIONSHIPS IN DENSELY CONNECTED NETWORKS

RELATED APPLICATIONS

This application is a Continuation of and claims the priority benefit of U.S. application Ser. No. 13/728,461 filed Dec. 27, 2012.

BACKGROUND

Embodiments of the inventive subject matter generally relate to the field of data organization, and more particularly to presenting complex associations between various data fields.

With complex data sets, organizing the data into tables, charts, diagrams, etc. is often helpful in interpreting the data. Specifically, many tables, charts, diagrams, etc. ease the process of analyzing associations between various data fields. Data sets containing multiple data fields can include a collection of photographs, a collection of music, statistics relating to business, scientific research, etc.

A collection of photographs may have several data fields, such as a photograph number, location the photograph was taken, date the photograph was taken, and the people that are in the photograph. Additionally, a single person, date, or location can be associated with more than one photograph. To explore the relationships between the different data fields, charts can be organized into various configurations. For example, to analyze the association between the people in the photographs and the other various data fields, a table can be configured with the left-most column containing the names of individuals in the collection of photographs. Subsequent rows to the right of the "names" column may then contain additional information, such as photograph number, location, and date. This configuration provides useful information sorted by person. It however does not provide information about other associations as readily, e.g. the association between date and location.

Pivot tables can be utilized to aid in analyzing the relationship between various data fields. Unlike a static table, a pivot table is dynamic, and can be reconfigured to sort data sets based on selected parameters. As such, pivot tables allow the resorting of data to understand relationships between the various data fields. For example, a pivot table sorting by name can be reconfigured to be sorted by location, etc.

SUMMARY

Some embodiments of the inventive subject matter include presenting a circular user interface, wherein the circular user interface contains data fields and data field elements consistent with a data set. A visual representation of the data set is presented. User input is received via the circular user interface, wherein the user input indicates a reorganization of the visual representation of the data set. The circular user interface is presented consistent with the user input and the visual representation of the data set consistent with the reorganization of the visual representation of the data set is presented.

BRIEF DESCRIPTION OF THE DRAWINGS

The present embodiments may be better understood, and numerous objects, features, and advantages made apparent to those skilled in the art by referencing the accompanying drawings.

FIGS. 2a-2c depict data tables 200, 220, and 240 presenting the data set from FIG. 1 with different sort-precedence.

FIG. 11 depicts the resulting data table 1100 after the expanding function depicted in FIG. 9 is complete.

FIG. 20 depicts the resulting data table 2000 after the descending-sort function of FIG. 18 is complete.

DESCRIPTION OF EMBODIMENT(S)

Figure 1:
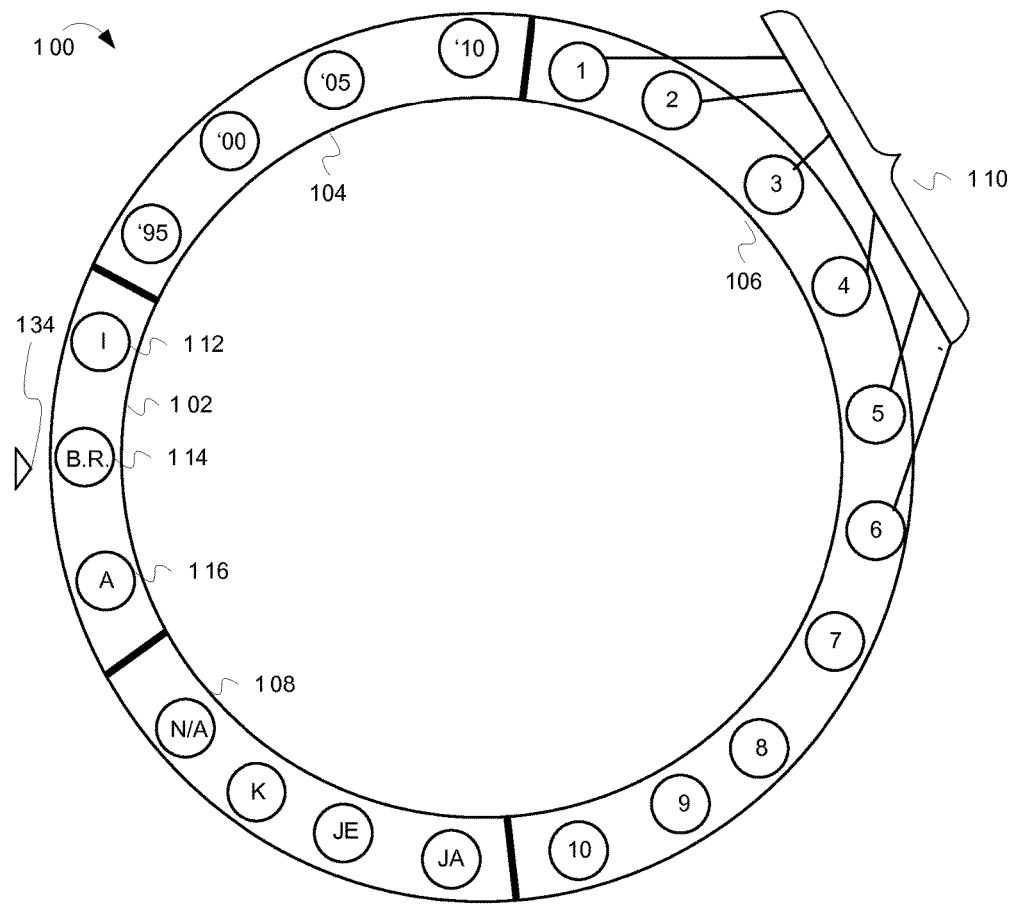
FIG. 1a depicts a circular user interface 100 associated with the data set presented in the data table 118 in FIG. 1b, according to some embodiments of the inventive subject matter.
FIG. 1b depicts a data table 118 that can be manipulated by the circular user interface 100, according to some embodiments of the inventive subject matter.

The description that follows includes exemplary systems, methods, techniques, instruction sequences and computer program products that embody techniques of the present inventive subject matter. However, it is understood that the described embodiments may be practiced without these specific details. For instance, although examples refer to organization of a photograph collection, the same methods apply to the organization of any data sets. Additionally, although the examples refer to manipulating data in a data table, the same methods apply to manipulating the data in other graphical representations, such as tree diagrams, node and arc diagrams, etc. In other instances, well-known instruction instances, protocols, structures and techniques have not been shown in detail in order not to obfuscate the description.

In some embodiments of the inventive subject matter, a circular user interface may be used to reconfigure a dynamic table to explore the various relationships between the data fields in the data set. That is, a user can reorder the dynamic table by interacting with the circular user interface. The circular user interface may comprise a ring divided into portions, where each portion resides around the ring's circumference. Each portion of the ring may represent a distinct data field within the data set, such as the name of an individual who appears in a photograph, the location photographs were taken, etc. Furthermore, the size of each portion may be proportional to the number of data elements in the data field. A user can interact with the circular user interface to reconfigure the dynamic table, or other data structures. For example, a user may be able to manipulate the circular user interface by mouse click, keyboard input, touch gesture, etc.

For ease, FIGS. 1-23 will use the same photograph data set for illustrative purposes.

FIG. 1a depicts a circular user interface 100 associated with the data set presented in the data table 118 in FIG. 1b, according to some embodiments of the inventive subject matter. As depicted in FIGS. 1a-1b, the data set is a set of photographs. Each photograph has an associated data field element for "place," "date," "photograph number," and "person" depicted in the photograph. In some embodiments, each portion of the circular user interface 100 may represent a distinct data field 102, 104, 106, and 108. In FIG. 1a, data fields "place" 102, "date" 104, "photograph number" 106, and "person" 108 are displayed on the circular user interface 100. Each data field 102, 104, 106, and 108 contains a plurality of data field elements 110 representing distinct data field elements 110 within the data fields 102, 104, 106, and 108. For example, the data field "place" 102 contains data field elements "Indianapolis" 112, "Baton Rouge" 114, and "Austin" 116.

As depicted in FIG. 1a, the circular user interface 100 is configured with a sort-precedence beginning at the 9 o'clock position, indicated by the sort-precedence indicator 134, and descending with each data field 102, 104, 106, and 108 counterclockwise from the 9 o'clock position. That is, "place" 102 has the highest sort-precedence, followed by "date" 104, "photograph number" 106, and "person" 108, respectively. In other word, the data is first sorted relative to "place"—"place" is the leftmost column in table 118. In some embodiments, the sort-precedence may begin at any position. That is, the specific position of highest sort-precedence is irrelevant. In some embodiments, sort-precedence may decrease proceeding counterclockwise. In other embodiments, sort precedence may decrease proceeding clockwise. In further embodiments, there be any other suitable mechanism to depict sort-precedence. The circular user interface 100 may be manipulated to modify the presentation of the data. For example, the circular user interface 100 may be rotated to alter sort-precedence. That is, the circular user interface 100 may be rotated relative to the sort-precedence indicator 134 to change which data field 102, 104, 108 has the highest sort precedence.

Figure 4:
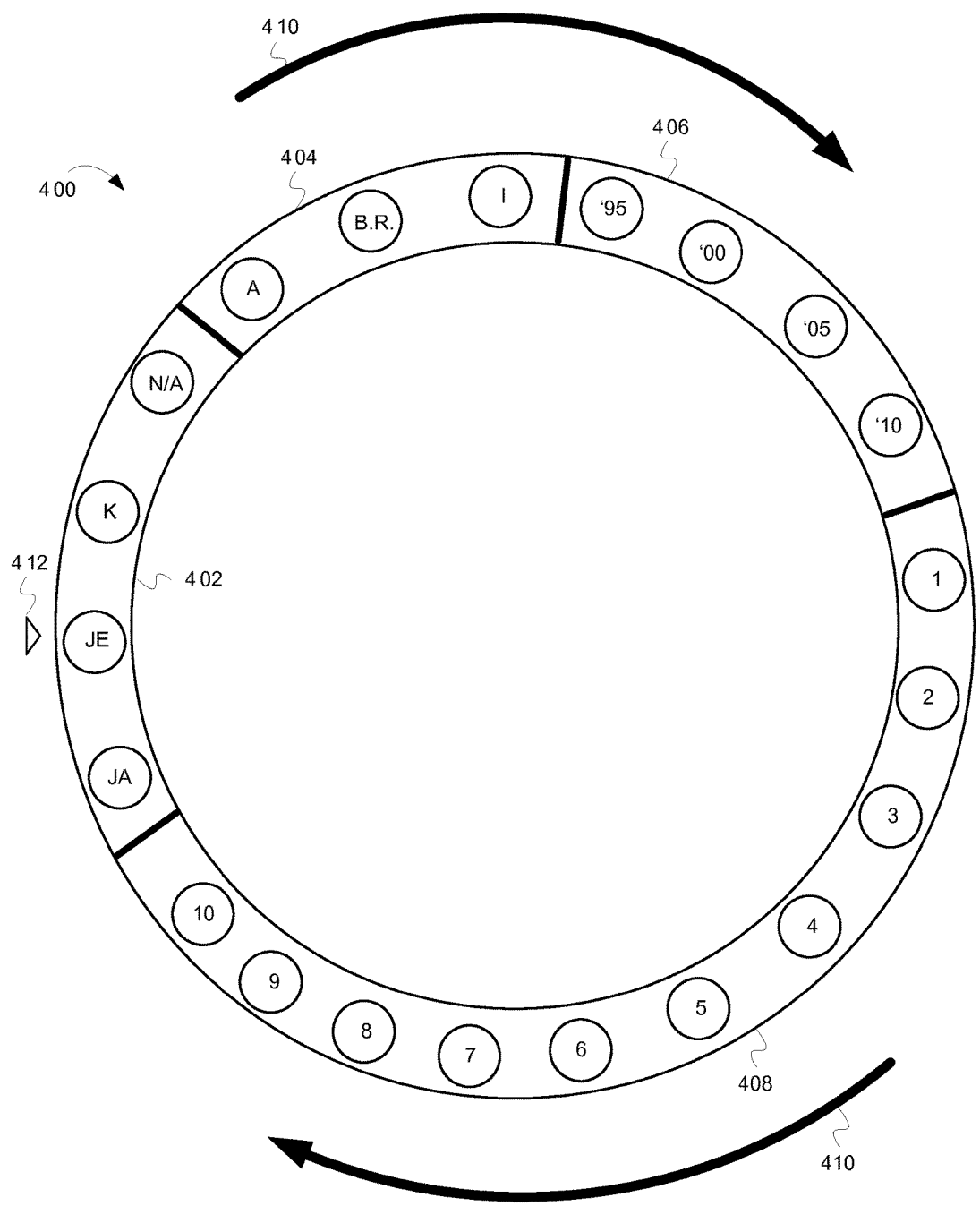
FIG. 4 depicts a process to manipulate the sort-precedence using the circular user interface 400, according to some embodiments of the inventive subject matter.
Figure 5:
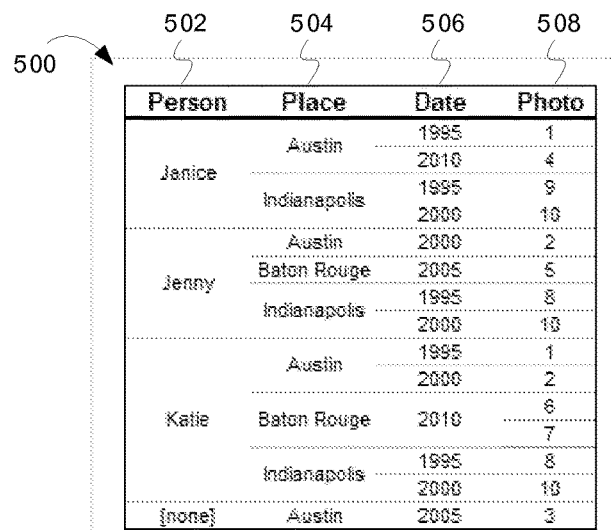
FIG. 5 depicts the resulting data table 500 after the sort-precedence manipulation of FIG. 4 is complete.

FIG. 1b depicts a data table 118 that can be manipulated by the circular user interface 100, according to some embodiments of the inventive subject matter. The data table 118, presents the data set represented by the circular user interface 100 in FIG. 1a. The data table 118 contains data fields for "place" 120, "date" 122, "photograph number" 124, and "person" 126. As discussed in FIG. 1a, the circular user interface 100 is configured to allow "place" 102 to take highest sort-precedence. Consequently, the data table 118 presents the data set sorted by "place." As discussed in the following figures, some embodiments of the inventive subject matter may allow a user to manipulate and reconfigure the data table 118. For example, in some embodiments, a user may be able to change which data field has the highest sort-precedence by rotating the circular user interface 100 (as shown in FIGS. 4-5).

In some embodiments, the circular user interface 100 may be a graphical user interface (GUI). In such embodiments, the circular user interface 100 may be able to be manipulated by touch gesture, mouse input, keyboard input, or any other suitable input.

FIGS. 2a-2c depict data tables 200, 220, and 240 presenting the data set from FIG. 1 with different sort-precedence. Often times, manipulating the display of data in a data table (or other graphical representation of data) can be aid in interpreting the data.

For example, data table 200 presents the information about the set of photographs discussed above. Data table 200 presents the data with the "person" data field 202 having the highest sort-precedence (as indicated by the "person" data field being the left-most column in data table 200). Data table 200 allows a user to quickly and easily determine the relationship between the people in the photographs (the "person" data field 202) and the location in which the people were photographed (the "place" data field 204). That is, a user can quickly and easily determine that the set of photographs contains photographs of Janice in both Austin and Indianapolis (as show in data table 200). Additionally, data table 200 also allows a user to quickly and easily determine the relationship between a person and the year the photograph was taken. That is, a user can quickly and easily determine that the set of photographs contains photographs of Jenny taken in 1995, 2000, and 2005 (as shown in data table 200). Data table 200 however may not allow a user to easily determine the relationship between the year the photographs were taken, and the place where the photographs are taken.

Data table 220 presents the information about the set of photographs with the "date" data field 222 having the highest sort-precedence (as indicated by the "date" data field being the left-most column in data table 220). Data table 220 allows a user to quickly determine the relationship between the year that the photographs were taken and the place where the photograph was taken. That is, a user may be able to quickly and easily determine that photographs in the data set that were taken in 1995 were taken in both Austin and Indianapolis (as shown in data table 220). Data table 220 however may not allow a user to quickly see the relationship between the photograph number and the person depicted in the photograph, the place where the photograph was taken, and the date the photograph was taken.

Data table 240 presents the information about the set of photographs with the "photo" data field 242 having the highest sort-precedence. Data table 240 allows a user to quickly and easily see the relationship between the photograph number and the person depicted in the photograph, the place the photograph was taken, and the date the photograph was taken. That is, a user may be able to quickly and easily determine photograph 1 is a picture of both Janice and Katie, and was taken in Austin in 1995 (as depicted in data table 240).

Figure 3:
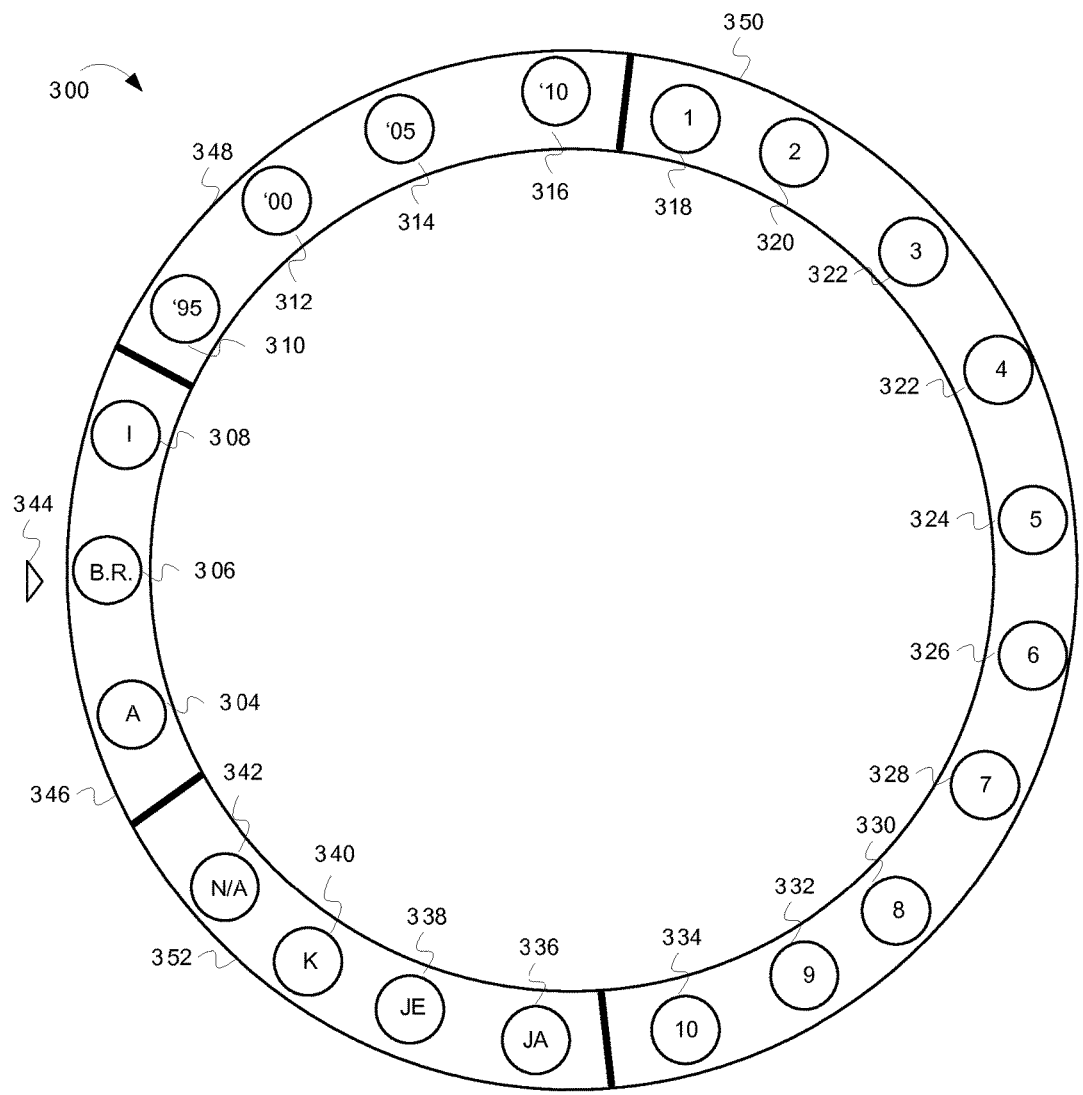
FIG. 3 depicts a circular user interface 300, according to some embodiments of the inventive subject matter.

FIG. 3 depicts a circular user interface 300, according to some embodiments of the inventive subject matter. In some embodiments, the circular user interface 300 may allow a user to manipulate and rearrange the data displayed in a data table (or other suitable data structure). For example, a user may be able to manipulate the data fields displayed in the data table through the circular user interface 300 (see FIGS. 6-11). In some embodiments, a user may also be able to rearrange the data columns or rows of the data table to create a new sort-precedence through the circular user interface 300 (see FIGS. 4-5).

In some embodiments, the circular user interface may be divided into portions, each portion representing a distinct data field 346-352. In FIG. 3, in clockwise order beginning at the sort-precedence indicator 344, the portions of the circular user interface 300 represent the "place" data field 346, the "date" data field 348, the "photo" data field 350 indicating the photograph number, and the "person" data field 352 indicating the person or people appearing in the photograph.

Additionally, in some embodiments, the data fields 346-352 represented by portions of the circular user interface 300 may contain data field elements 304-342. FIG. 3 depicts three data field elements 304-308 contained within the "place" data field 346. Data field element 304 represents the "Austin" data field element within the "place" data field 346. Data field element 306 represents the Baton Rouge data field element within the "place" data field 346. Data field element 308 represents the "Indianapolis" data field element within the "place" data field 346.

Likewise, the "date" data field 348 contains data field elements 310-318 representing the years 1995, 2000, 2005, and 2010, respectively. The "photo" data field 350 contains data field elements 318-334 representing photograph numbers 1 through ten, respectively. The "person" data field contains data field elements 336-342 representing the people Janice, Jenny, Katie, and N/A (if no person appears in the photo), respectively.

FIG. 4 depicts how moving the circular user interface 400 can change sort-precedence of a dataset, according to some embodiments of the inventive subject matter. In some embodiments, a user may be able to adjust the sort-precedence of the data table by rotating the circular user interface 400 with respect to the sort-precedence indicator, as indicated by the arrows 410. As depicted in FIG. 4, the "person" data field 402 has been rotated to align with the sort-precedence indicator 412. Therefore, the data table (shown in FIG. 5) will now be sorted with respect to the "person" data field 402. Consequently, the new sort-precedence order, decreasing clockwise from the sort-precedence indicator, is the "person" data field 402, the "place" data field 404, the "date" data field 406, and the "photo" data field 408.

In other embodiments, the sort-precedence may be rearranged relative to the different data fields 402-408. For example, the position of the "date" data field 408 and the "place" data field 404 may be swapped. The resulting sort precedence order displayed on the circular user interface 400, beginning at the sort-precedence indicator and decreasing clockwise, would be the "person" data field 402, the "date" data field 408, the "place" data field 404, and the "photo" data field 408. The resulting data table would present the data fields 402-408 in the same order, from left to right.

FIG. 5 depicts the resulting data table 500 after the sort-precedence manipulation of FIG. 4 is complete. Because the circular user interface was rotated clockwise aligning the "person" data field 502 with the sort-precedence indicator, data table 500 now presents the data with the "person" data field 502 having the highest sort-precedence (as indicated by the "person" data field 502 being the left-most column). Data table 500 also presents the remainder of the data fields in the same order that they appear on the circular user interface: "person" data field 502, followed by "place" data field 504, "date" data field 506, and "photo" data field 508.

Figure 6:
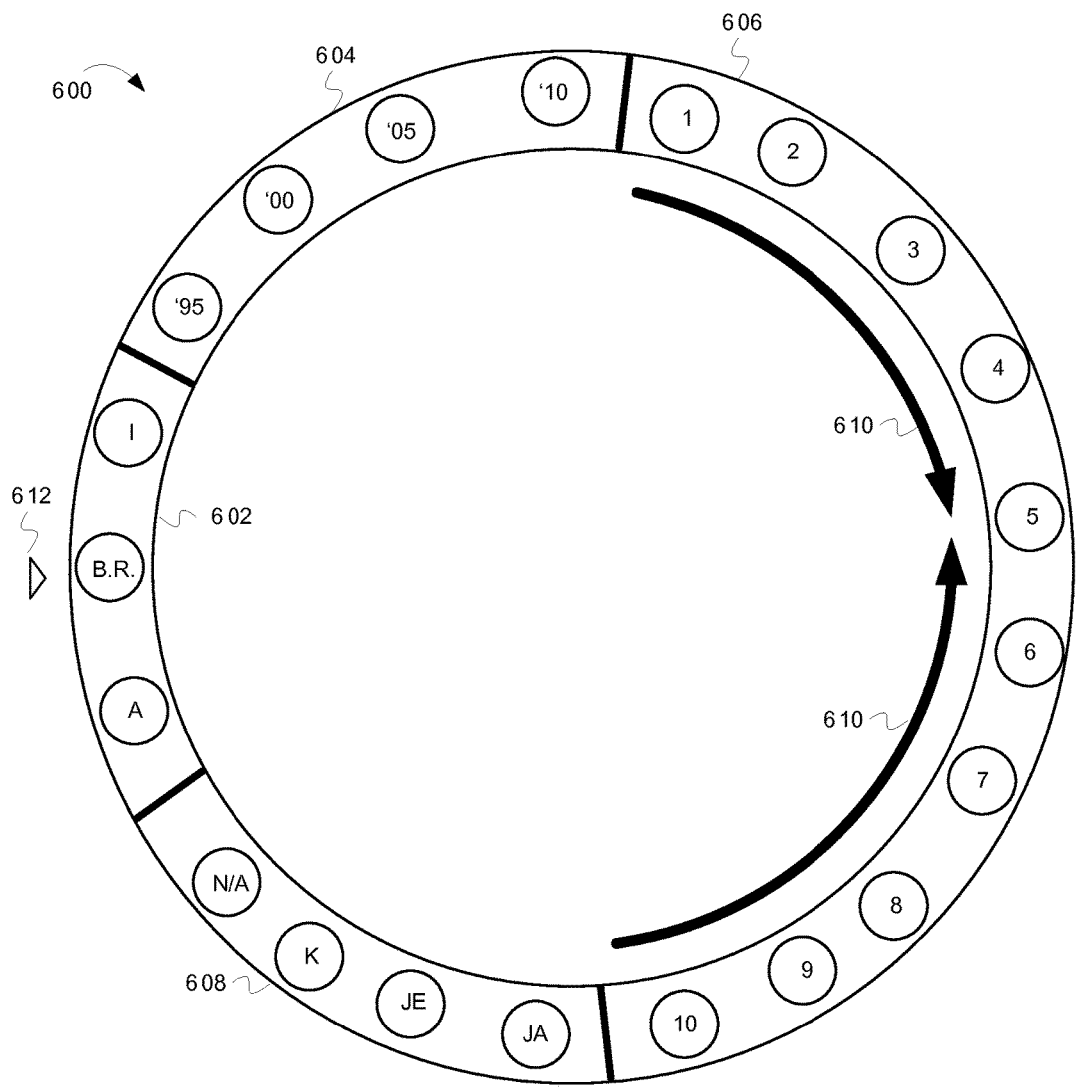
FIG. 6 depicts a process to hide some of the data fields 602, 604, 606, and 608, using the circular user interface 600, according to some embodiments of the inventive subject matter.

FIG. 6 shows how to hide some of the data fields 602-608, using the circular user interface 600, according to some embodiments of the inventive subject matter. In some embodiments, a user may be able to hide certain data fields 602-608 by performing a gesture, mouse input, keyboard input, etc. using the circular user interface 600. In embodiments utilizing a touchscreen device, a user may be able to hide certain data fields 602-608 by placing two fingers on the circular user interface 600 near the data field 602-608 wished to be hidden and performing a pinching motion, as indicated by arrows 610. As depicted in FIG. 6, an input to hide the "photo" data field 606 is being performed.

Figure 7:
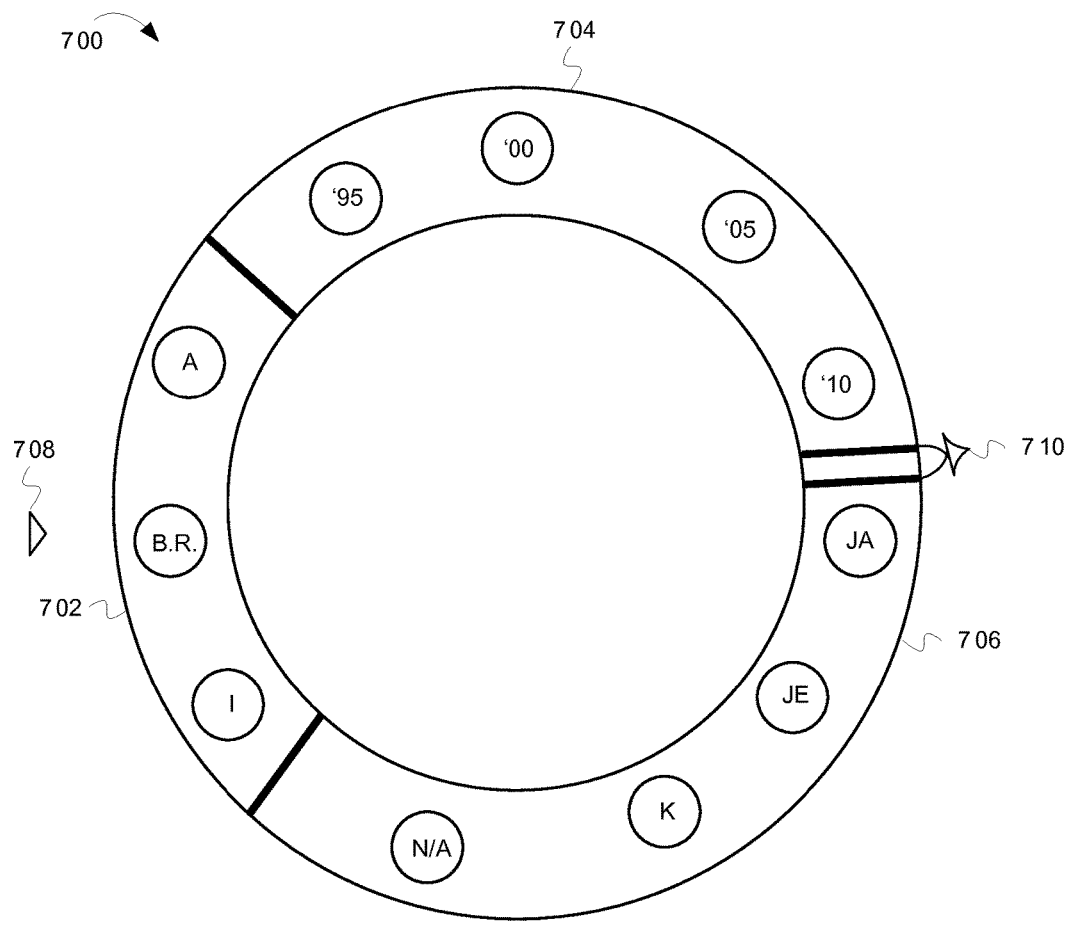
FIG. 7 depicts the resulting circular user interface 700 after the hiding function depicted in FIG. 6 is complete.

FIG. 7 depicts the resulting circular user interface 700 after the hiding function depicted in FIG. 6 is complete. After hiding the "photo" data field, the circular user interface 700 now presents only the "place" data field 702, the "date" data field 704, and the "person" data field 706. The sort-precedence has not been affected by this change, as indicated by the "place" data field 702 remaining aligned with the sort-precedence indicator 708. Additionally, the hidden data field is indicated by double-bar 710.

Figure 8:
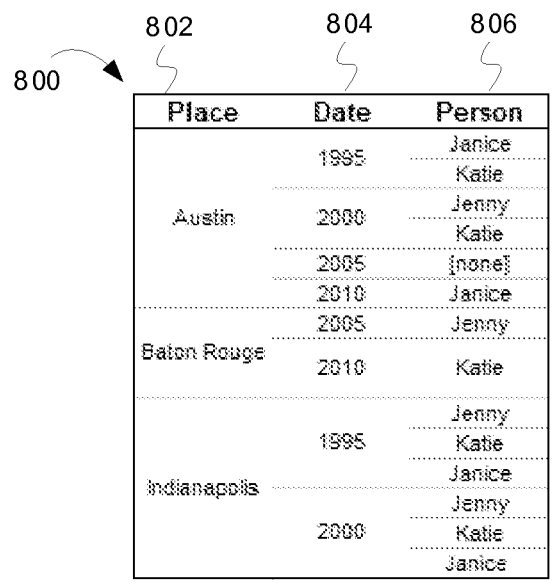
FIG. 8 depicts the resulting data table 800 after the hiding function depicted in FIG. 6 is complete.

FIG. 8 depicts the resulting data table 800 after the hiding function depicted in FIG. 6 is complete. After hiding the "photo" data field, the data table 800 now presents only the "place" data field 802, the "date" data field 804, and the "person" data field 808. As discussed in FIG. 7, the sort precedence remains unchanged.

Figure 9:
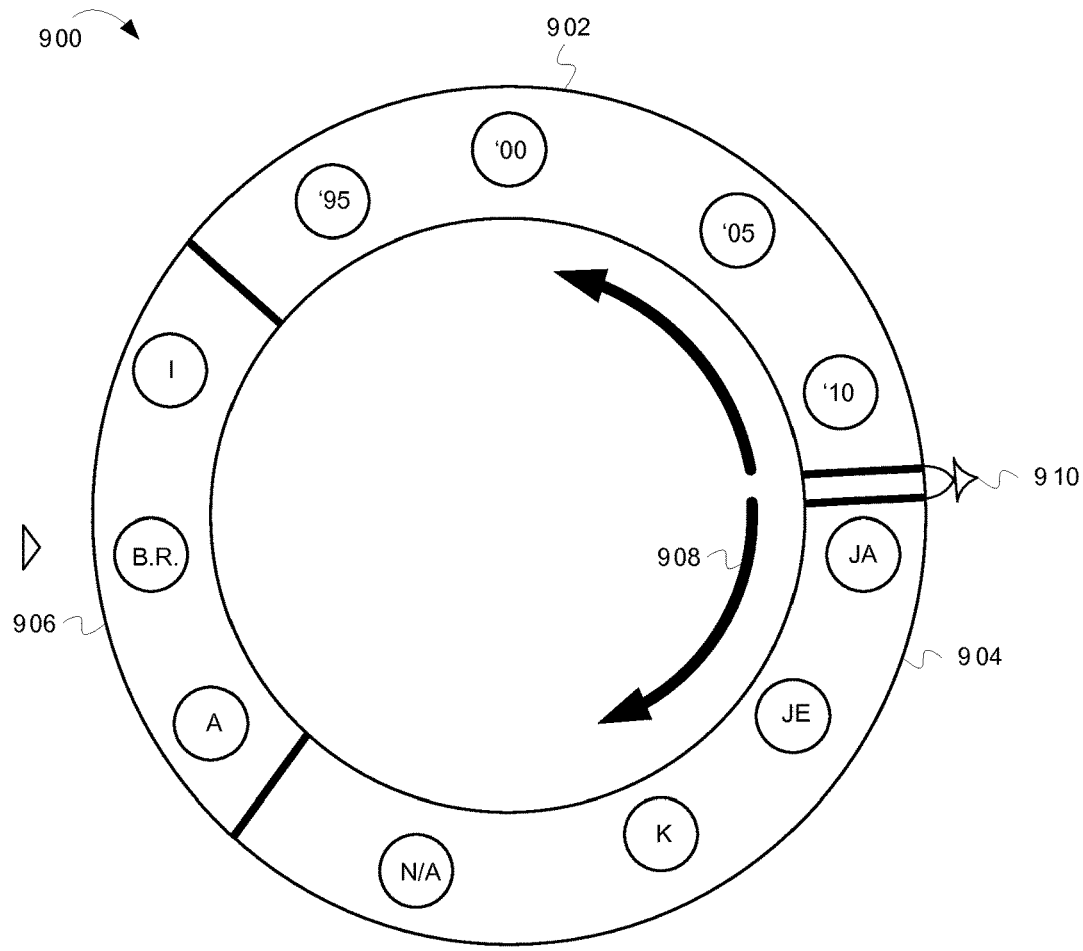
FIG. 9 depicts a process to expand a hidden data field using the circular user interface 900, according to some embodiments of the inventive subject matter.

FIG. 9 depicts a process to expand a hidden data field using the circular user interface 900, according to some embodiments of the inventive subject matter. Again, the hidden data field is indicated by double-bar 910. In some embodiments, a user may be able to expand hidden data fields by performing a gesture, mouse input, keyboard input, etc. using the circular user interface 900. In embodiments utilizing a touchscreen device, a user may be able to expand hidden data fields by placing two fingers on the circular user interface 900 near the location of the data field wished to be expanded and performing a reverse pinching motion, as indicated by arrows 908. As depicted in FIG. 9, the "place" data field 906, "date" data field 902, and the "person" data field 904 are being presented on the circular user interface 900.

Figure 10:
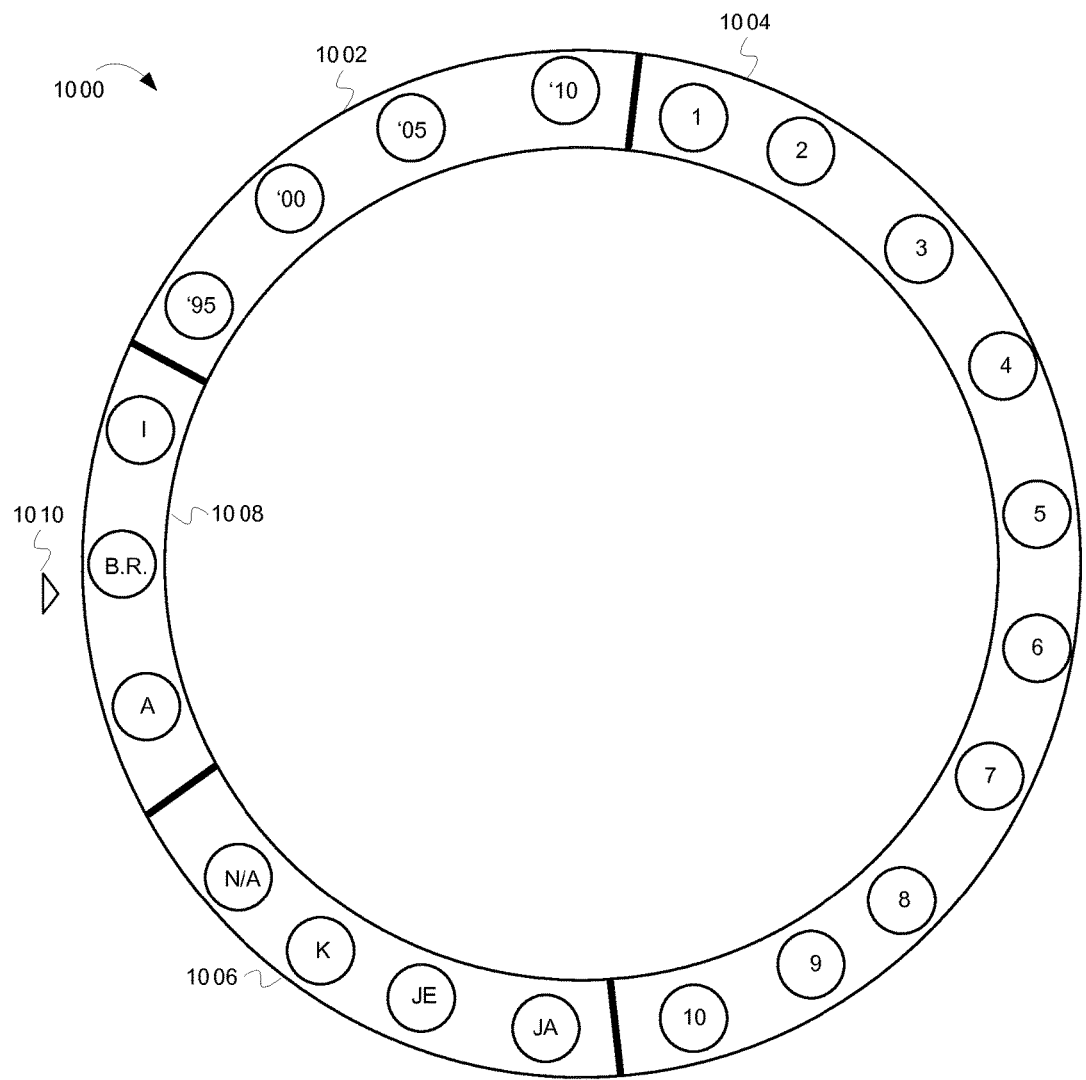
FIG. 10 depicts the resulting circular user interface 1000 after the expanding function depicted in FIG. 9 is complete.

FIG. 10 depicts the resulting circular user interface 1000 after the expanding function depicted in FIG. 9 is complete. As shown, the "photo" data field 1004 is once again being presented on the circular user interface 1000. The sort-precedence has not been affected by this change, as indicated by the "place" data field 1008 remaining aligned with the sort-precedence indicator 1010. Additionally, the sort-precedence of the data fields 1002-1008 has returned to its pre-hidden order (depicted in FIG. 6).

FIG. 11 depicts the resulting data table 1100 after the expanding function depicted in FIG. 9 is complete. After expanding the "photo" data field 1106, the data table 1100 once again presents the "place" data field 1102, the "date" data field 1104, the "photo" data field 1106, and the "person" data field 1108. As discussed in FIG. 10, the sort precedence remains unchanged.

Figure 12:
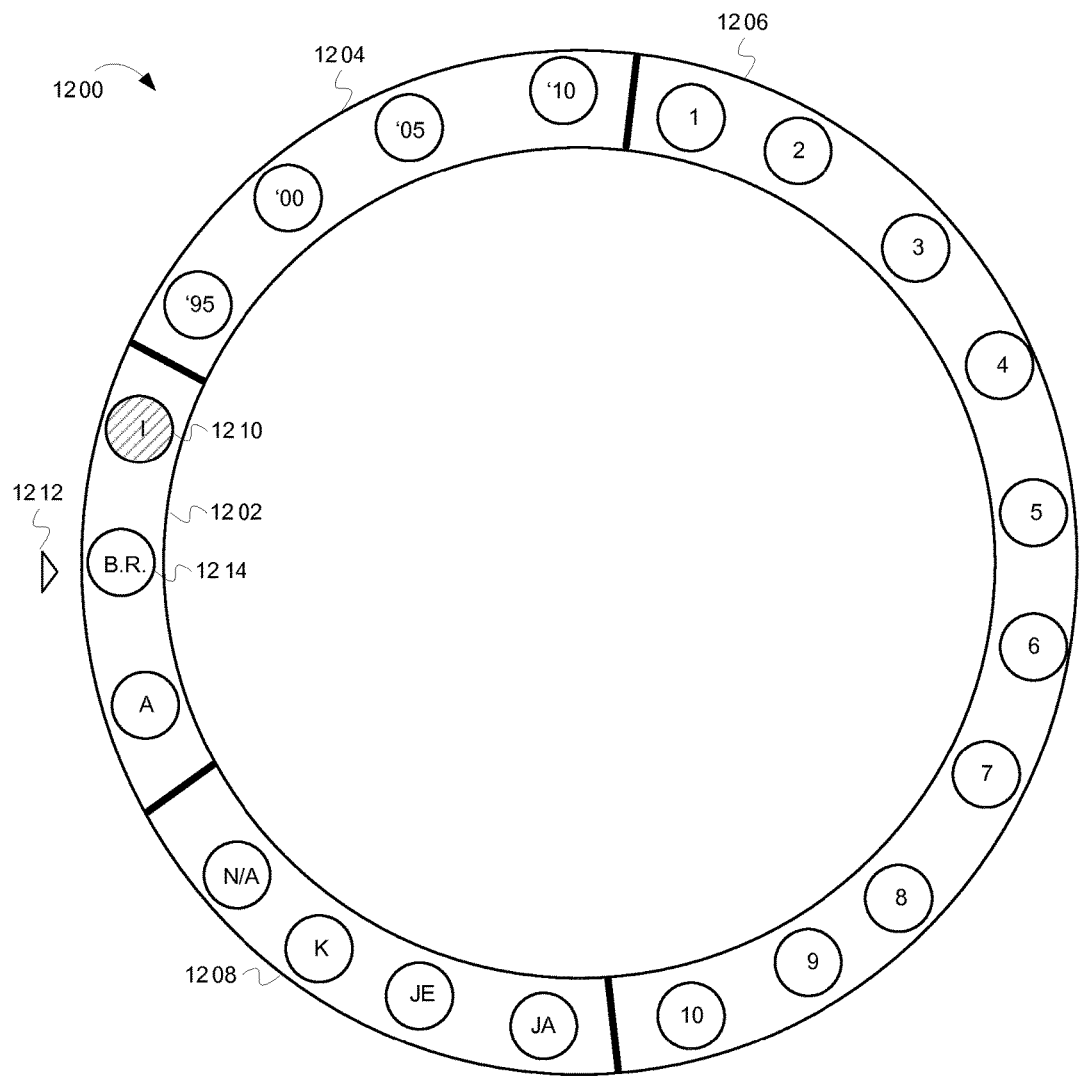
FIG. 12 depicts a process to filter the data set with respect to one data field element 1210 using the circular user interface 1200, according to some embodiments of the inventive subject matter.

FIG. 12 depicts a process to filter the data set with respect to one data field element 1210 using the circular user interface 1200, according to some embodiments of the inventive subject matter. In some embodiments of the inventive subject matter, the circular user interface 1200 can be manipulated to display only data set entries that relate to a chosen data field element. For example, as depicted in FIG. 12, the data field element 1210 associated with Indianapolis is selected. This will cause only photographs associated with Indianapolis to be displayed (see FIG. 13).

It should be noted that additional operations are possible. For example, "swiping" a data field element outside of the circular user interface 1200 may exclude photographs associated with that data element from the circular user interface 1200 and the associated visual representation of the data. Additionally, multiple data field elements can be selected. For example, data field elements Indianapolis 1210 and Baton Rouge 1214 may be selected. The result would be to display only those data field elements associated with Indianapolis and Baton Rouge (i.e., photographs taken in Indianapolis and Baton Rouge).

Figure 13:
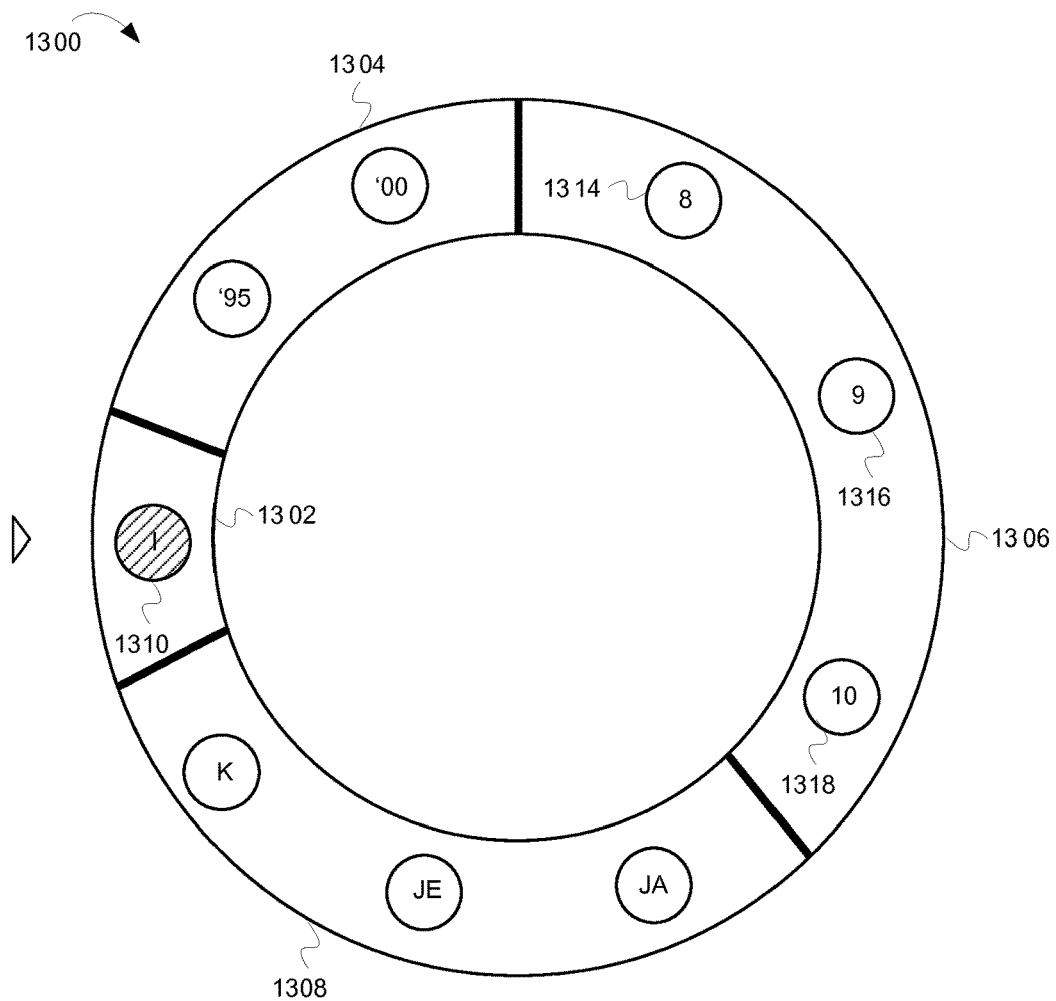
FIG. 13 depicts the resulting circular user interface 1300 after the filtering function depicted in FIG. 12 is complete.

FIG. 13 depicts the resulting circular user interface 1300 after the filtering function depicted in FIG. 12 is complete. In some embodiments, the circular interface 1300 will be changed as well as the data table (or other graphical representation of the data). The selected data element Indianapolis 1310 is shaded to indicate this selection. As shown in FIG. 13, the "place" data field 1302 now contains only the data field element associated with the Indianapolis data field element 1310. Although the remaining data fields 1304-1308 are still displayed, they now only contain the data field elements corresponding to photographs that were taken in Indianapolis. That is, the data field element "2005" is no longer displayed in the "date" data field 1304 because no photographs in the data set were taken in 2005 in Indianapolis. Likewise, only the data field elements for photographs number 8 1314, photograph 9 1316, and photograph 10 1318 remain, as these were the only three photographs in the set of photographs that were taken in Indianapolis.

Figure 14:
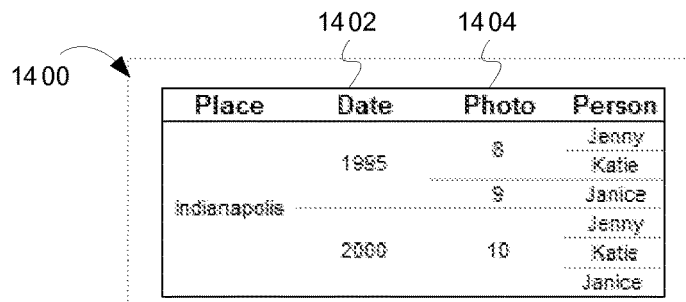
FIG. 14 depicts the resulting data table 1400 after the filtering function depicted in FIG. 12 is complete.

FIG. 14 depicts the resulting data table 1400 after the filtering function depicted in FIG. 12 is complete. Data table 1400, like the circular user interface in FIG. 13, now only displays the data fields for photographs that were taken in Indianapolis. As shown, the only data field elements remaining in the "date" data field 1402 are 1995 and 2000. Likewise, the only data elements remaining in the "photo" data field 1404 are photograph 8, photograph 9, and photograph 10.

Figure 15:
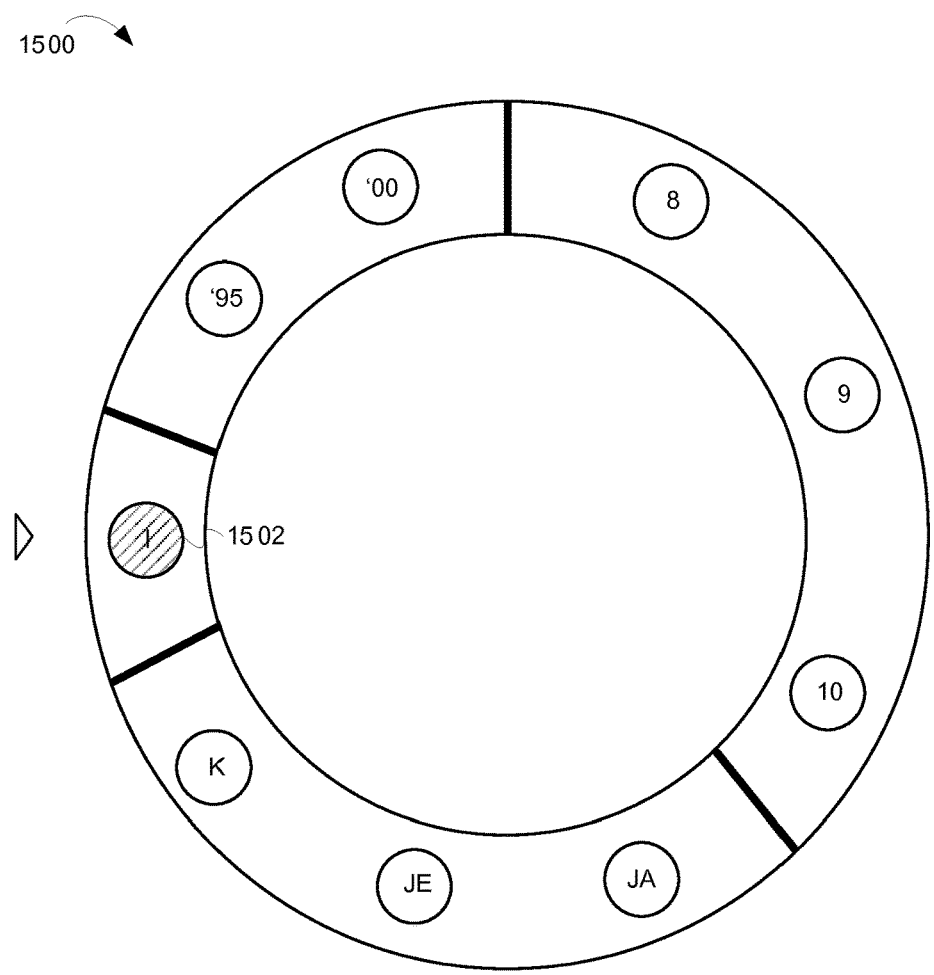
FIG. 15 depicts a process to de-filter the data set with respect to one data field element 1510 using the circular user interface 1500, according to some embodiments of the inventive subject matter.

FIG. 15 depicts a process to de-filter the data set with respect to one data field element 1502 using the circular user interface 1500, according to some embodiments of the inventive subject matter. In some embodiments, the circular user interface 1500 may be de-filtered by selecting the data field 1502 that was previously selected to filter the data set. In FIG. 12, the data field element associated with Indianapolis 1502 was selected, resulting in a filtered data set (as discussed in FIGS. 12-14). In FIG. 15, the data field element associated with Indianapolis 1502 is once again selected, resulting in a de-filtered circular user interface (see FIG. 16).

Figure 16:
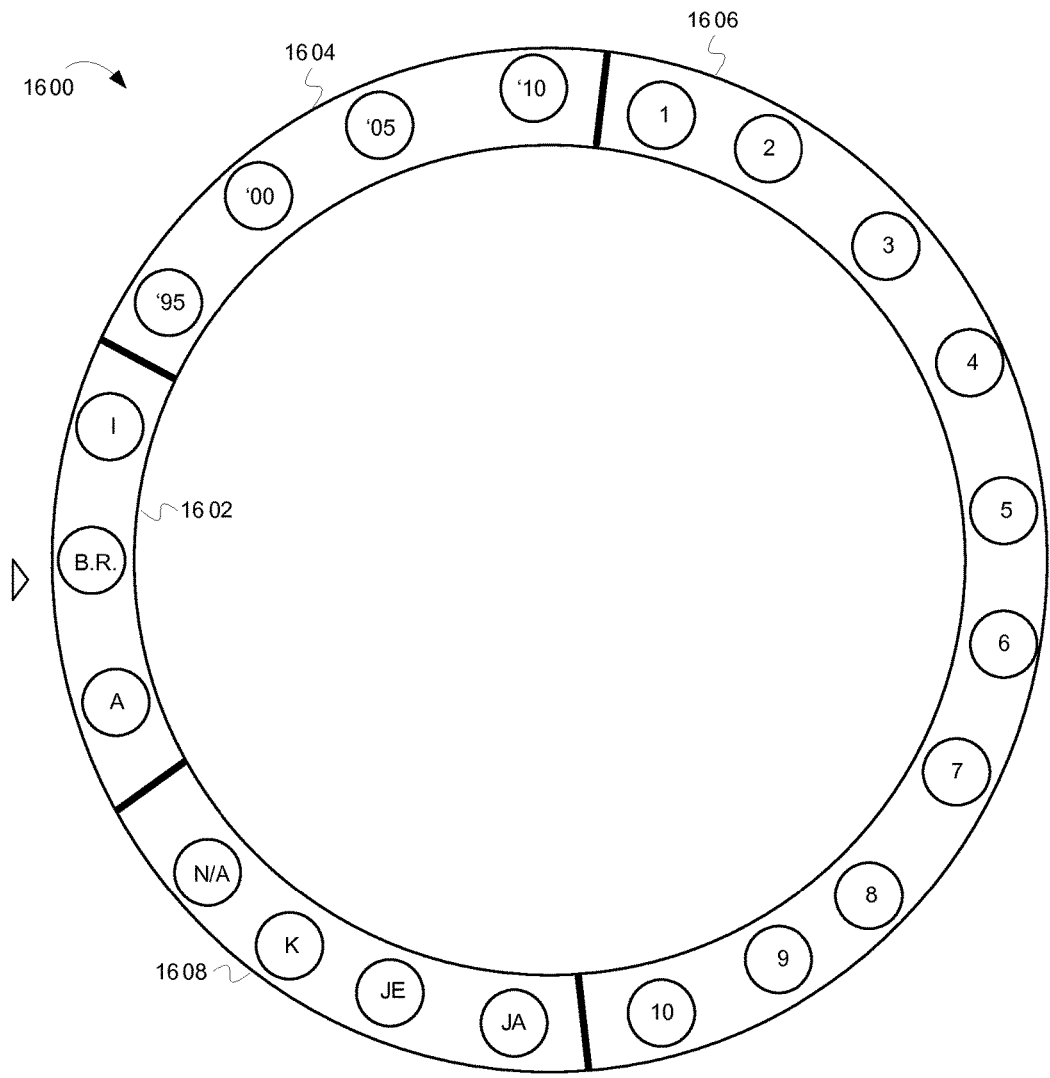
FIG. 16 depicts the resulting circular user interface 1600 after the de-filtering function of FIG. 15 is complete.

FIG. 16 depicts the resulting circular user interface 1600 after the de-filtering function of FIG. 15 is complete. As shown in FIG. 16, all data field elements associated with the data fields 1602-1608 have been restored.

Figure 17:
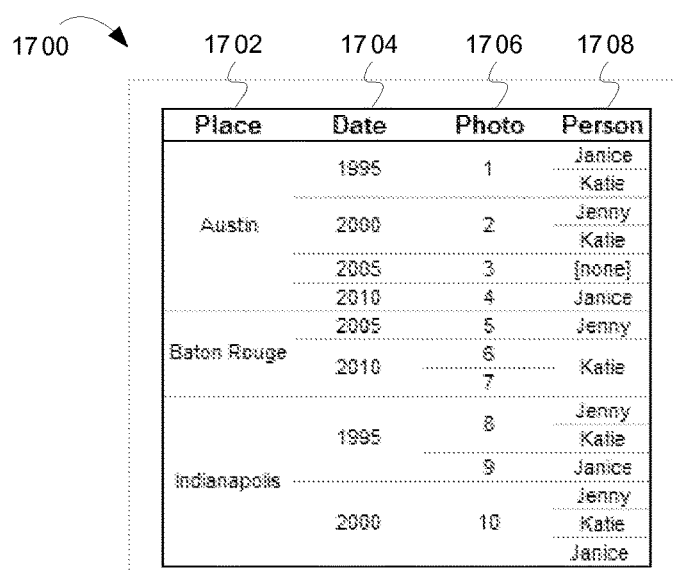
FIG. 17 depicts the resulting data table 1700 after the de-filtering function of FIG. 15 is complete.

FIG. 17 depicts the resulting data table 1700 after the de-filtering function of FIG. 15 is complete. As shown in FIG. 17, all data field elements associated with the data fields 1702-1708 have been restored.

Figure 18:
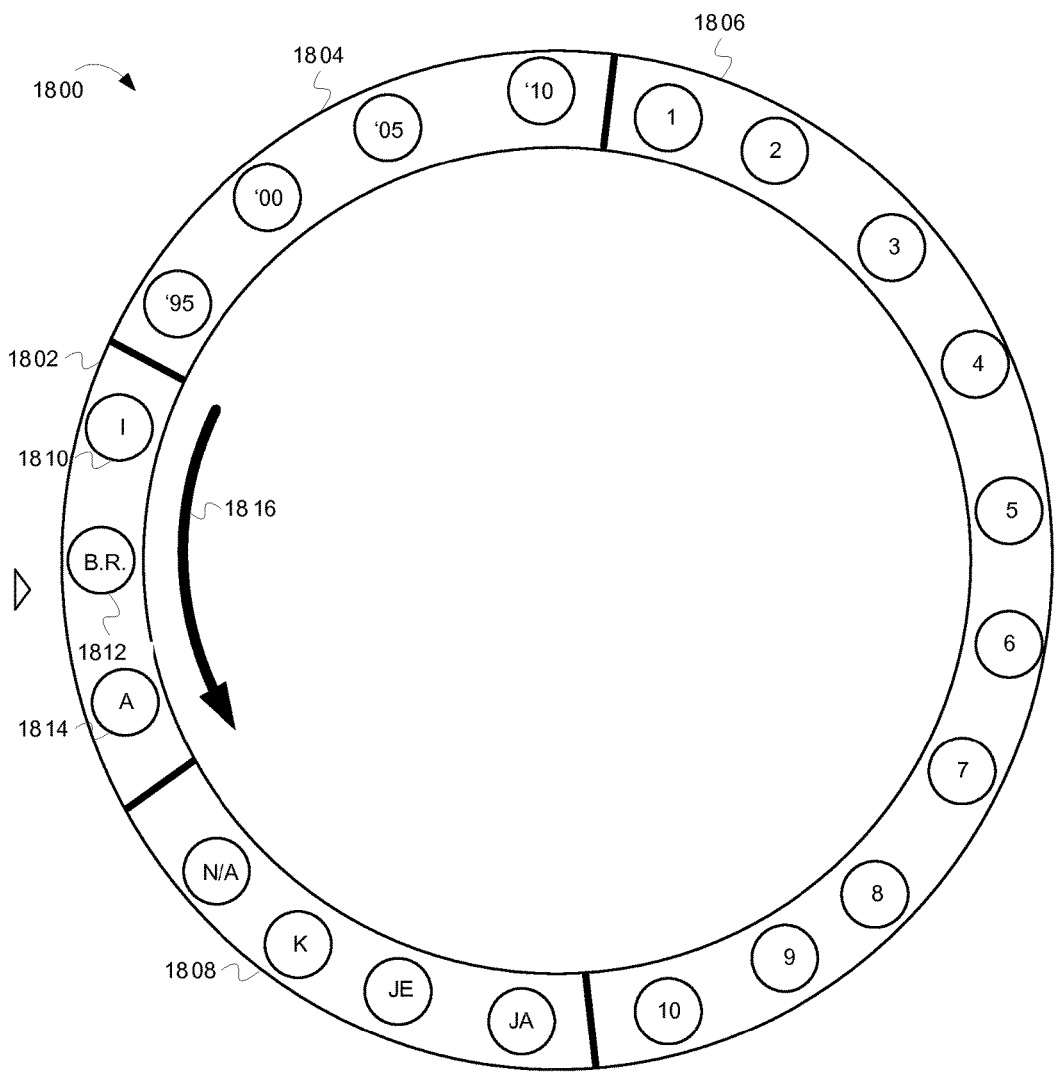
FIG. 18 depicts a process to sort the data field elements 1810, 1812, and 1814 in descending order using the circular user interface 1800, according to some embodiments of the inventive subject matter.

FIG. 18 depicts a process to sort the data field elements 1810, 1812, and 1814 in descending order using the circular user interface 1800, according to some embodiments of the inventive subject matter. In FIG. 18, sort-order from within a data field 1802-1808 behaves in the same manner as sort precedence. That is, sort order is ascending in a clockwise motion, and descending in a counterclockwise motion. In some embodiments, the data field elements 1810-1814 may be sorted by gesture input, mouse input, keyboard input, etc. In embodiments utilizing a touchscreen, the data field elements 1810-1814 may be sorted in a descending order by swiping in a downward motion (as indicated by arrow 1816) near the data field 1802 wished to be sorted. Note that the sort order of the remaining data fields 1804-1808 remains unchanged. That is, only the "place" data field 1802 has been manipulated to be sorted in descending order. In other embodiments, more than one data field 1802-1808 may be able to be sorted at a time with one downward swiping motion. In some embodiments, the data field elements 1810-1814 can be sorted in an ascending order using a similar input. For example, if the data field elements 1810-1814 are sorted in a descending order by swiping in a downward motion, the data field elements 1810-1814 may be able to be sorted in an ascending order by swiping in an upward motion.

Figure 19:
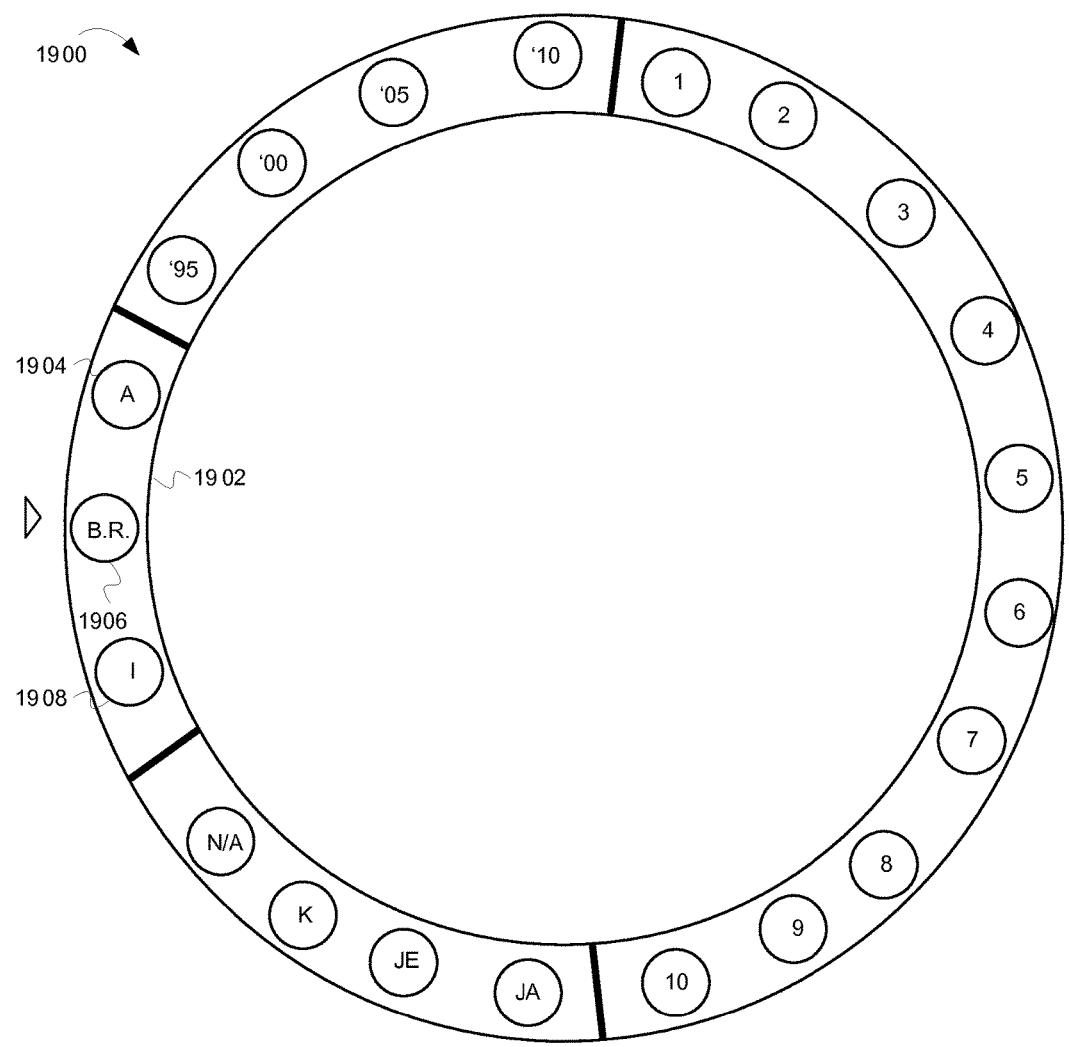
FIG. 19 depicts the resulting circular user interface 1900 after the descending-sort function of FIG. 18 is complete.

FIG. 19 depicts the resulting circular user interface 1900 after the descending-sort function of FIG. 18 is complete. As depicted in FIG. 19, the sort order of the data field elements 1904-1908 of the "place" data field 1902 are now in descending order when viewed in a clockwise direction. That is, moving in a clockwise direction, beginning at the "Indianapolis" data field element 1908, the alphabetical rank of the data field elements 1904-1908 is decreasing (i.e. Indianapolis 1908, Baton Rouge 1906, Austin 1904).

FIG. 20 depicts the resulting data table 2000 after the descending-sort function of FIG. 18 is complete. As depicted in data table 2000, data field elements 2004-2008 in the "place" data field 2002 are in descending alphabetical order from top-to-bottom (i.e. Indianapolis 2004, Baton Rouge 2006, Austin 2008).

Figure 21:
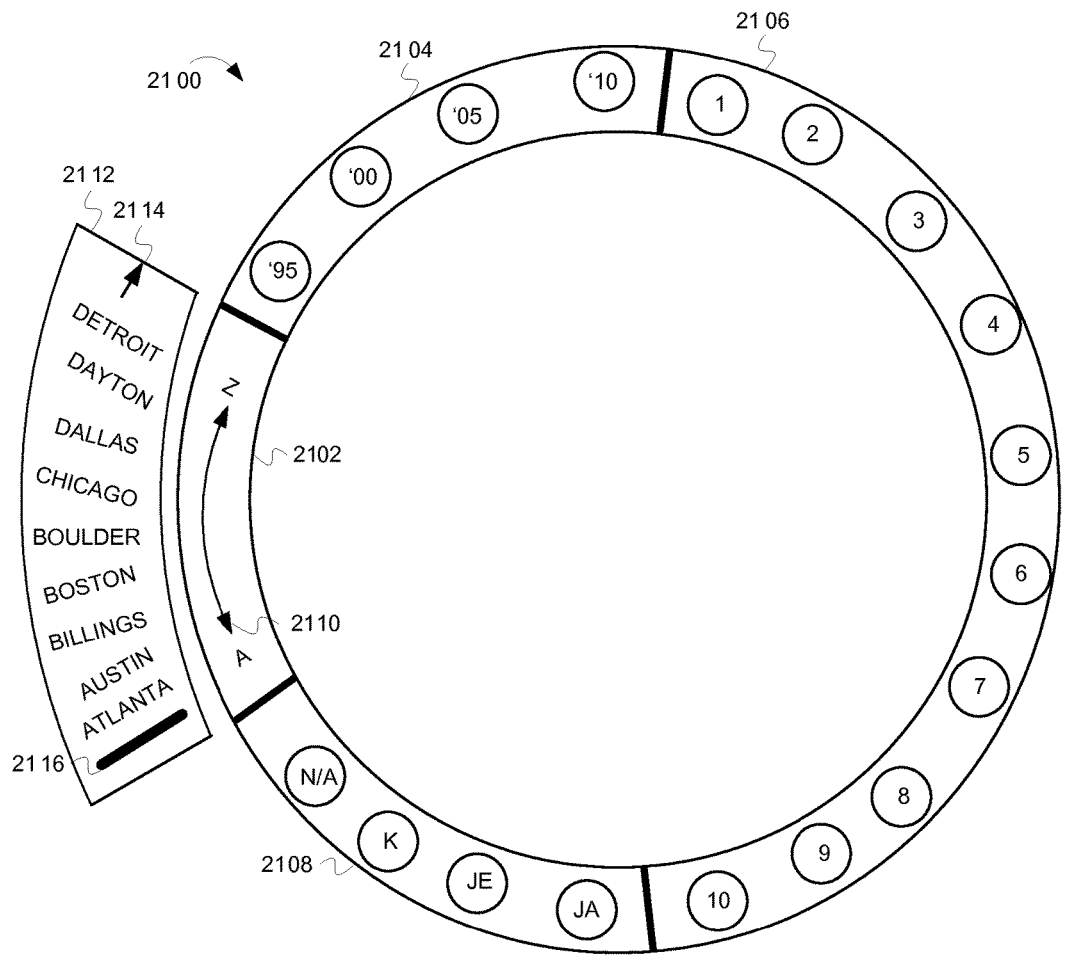
FIG. 21 depicts an example scalability feature of a circular user interface 2100, according to some embodiments of the inventive subject matter.

FIG. 21 depicts an example scalability feature of a circular user interface 2100, according to some embodiments of the inventive subject matter. Some data sets contain many data field elements in one or more of the data fields 2102-2108. For example, in a collection of photographs, there may exists photographs that were taken in 20, 30, or more locations. For such data sets, the data field elements may take up too great a portion of the circular user interface 2100, or, may simply not fit on the circular user interface 2100. Some embodiments of the inventive subject matter may provide scalability features to help alleviate this problem.

In some embodiments, when a data field (e.g. the "place" data field 2102) contains a large number of data field elements (i.e. Atlanta, Austin, Billings, etc.), the circular user interface 2100 may present a secondary user interface 2112. The secondary user interface 2112 may allow a user to scroll or advance through the data field elements. In some embodiments, the data field elements may be presented as a scrollable list. As depicted in FIG. 21, "Atlanta" is it first city listed alphabetically in the list. This is indicated by the bar 2116, showing that no data field elements exist before "Atlanta." At the top of the secondary user interface 2112, the arrow 2114 indicates that there are further data field elements that exist alphabetically after "Detroit" (e.g. Denver). In such embodiments, the user may be unable to scroll past either end of the list (i.e. the user cannot scroll to states that are alphabetically before Atlanta because none exist (in the data set)). This motion is indicated by arrow 2110.

In other embodiments however, the list may be circular. In other words, once the user reached the end (alphabetically) of the data set elements, the next data set elements to appear would be the first (alphabetically). For example, if the first city is Abbeville (La.) and the final three cities are Xenia (Ohio), Yorkshire (Va.), and Zion (Ill.), the user would see Xenia, Yorkshire, Zion, followed by Abbeville.

Figure 22:
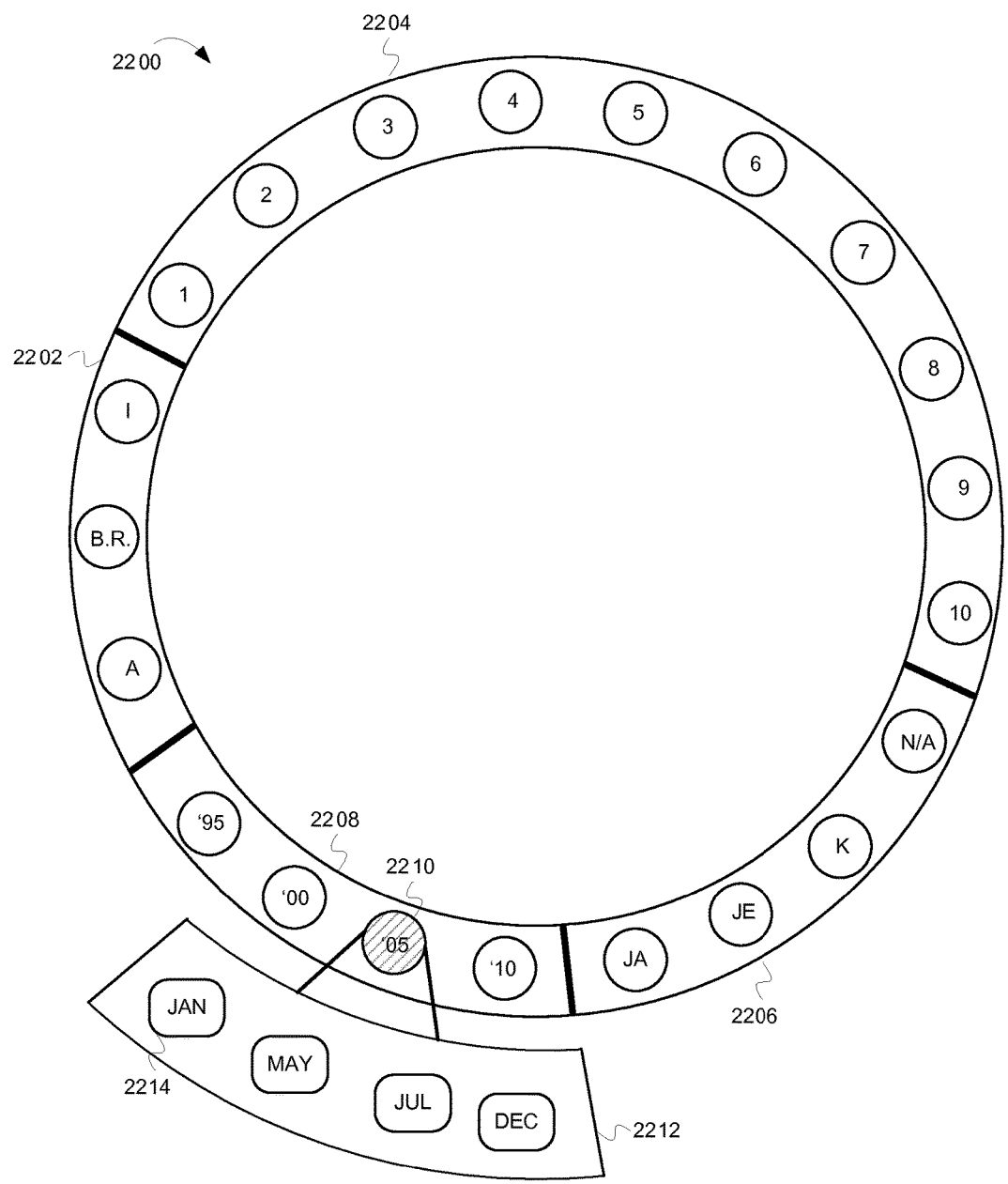
FIG. 22 depicts an example scalability feature of a circular user interface 2300, according to some embodiments of the inventive subject matter.

FIG. 22 depicts an example scalability feature of a circular user interface 2300, according to some embodiments of the inventive subject matter. Some data sets may contain subcategories within a data field element 2204-2208. For example, the set of photographs contains a "date" data field 2208. Within the "date" data a field, there may exist a first level of organization, the year. Each photograph however may contain more detailed date information however than simply the year. For example, each photograph may have an associated day, month, and year. As discussed in FIG. 21, it may be inconvenient to list all of this information directly on the circular user interface 2200 (i.e. the "date" data field 2208 would contain a data field element 2210 for every day of every month of every year associated with a photograph in the data set).

In some embodiments, the circular user interface 2200 may present a secondary user interface 2212, presenting more detailed information from within a data field element 2210 (e.g. subcategories 2214). As depicted in FIG. 22, the circular user interface 2200 presents a secondary user interface 2212 having subcategories 2214. A user may then be able to interact with the circular user interface 2200 through the secondary user interface 2212.

Figure 23:
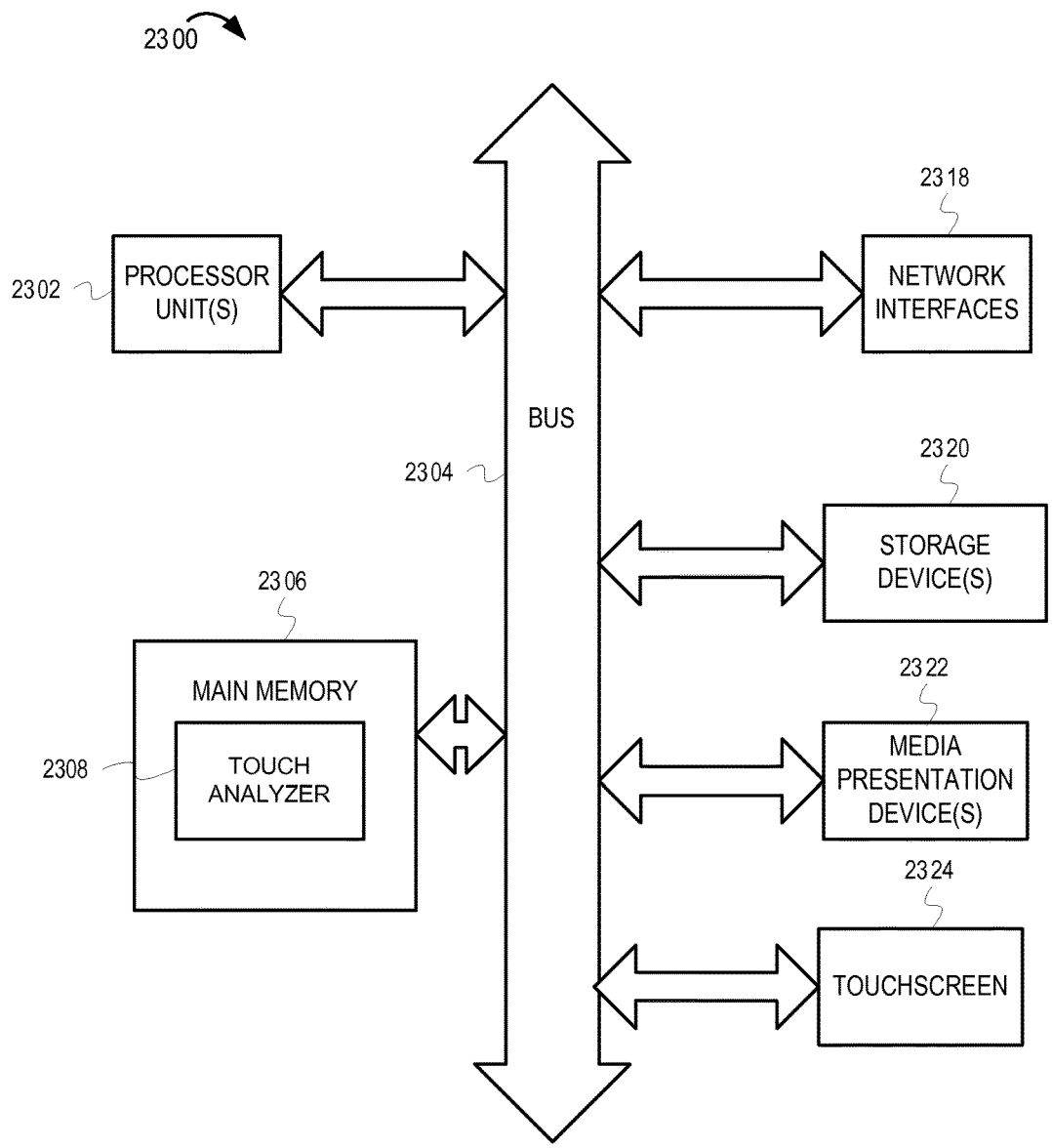
FIG. 23 is a block diagram of an electronic computing device on which a circular user interface may be used, according to some embodiments of the inventive subject matter.

FIG. 23 is a bock diagram of an electronic computing device on which a circular user interface may be used, according to some embodiments of the inventive subject matter. The electronic computing device 2300 includes a processor unit 2302 (possibly including multiple processors, multiple cores, multiple nodes, and/or implementing multi-threading, etc.). The electronic computing device 2300 includes memory 2306. The memory 2306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic computing device 2300 also includes a bus 2304 (e.g., PCI, ISA, PCI-Express, HyperTransport®, InfiniBand®, NuBus, etc.), a network interface 2318 (e.g., an ATM interface, an Ethernet interface, a Frame Relay interface, SONET interface, wireless interface, etc.), and a storage device(s) 2320 (e.g., optical storage, magnetic storage, etc.). The system memory 2306 embodies functionality to implement embodiments described above. The system memory 2306 may include a touch analyzer 2308. Any one of these functionalities may be partially (or entirely) implemented in hardware and/or on the processing unit 2302. For example, the functionality may be implemented with an application specific integrated circuit, in logic implemented in the processing unit 2302, in a co-processor on a peripheral device or card, etc. Further, realizations may include fewer or additional components not illustrated in FIG. 23 (e.g., video cards, audio cards, additional network interfaces, peripheral devices, etc.). The processor unit 2302, the storage device(s) 2320, and the network interface 2318 are coupled to the bus 2304. Although illustrated as being coupled to the bus 2304, the memory 2306 may be coupled to the processor unit 2302.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
presenting a circular user interface, wherein the circular user interface comprises a plurality of sections including a first section and a second section, wherein the first section is associated with a first data field of a data set and the second section is associated with a second data field of the data set;
presenting a first visual representation of the data set as a table separate from the circular user interface, the table having at least a first column associated with the first data field and a second column associated with the second data field, wherein the first column occupies a first position in the table and the second column occupies a second position in the table;
receiving user input via the circular user interface, wherein the user input indicates a selection of the first section of the circular user interface;
in response to user input, moving the first column to the second position in the table and the second column to the first position in the table; and
presenting a second visual representation of the data set as the table.

2. The method of claim 1 wherein the circular user interface contains a sort-precedence indicator to indicate a sort-precedence of each data field with respect to each other.

3. The method of claim 2, wherein the sort-precedence of each of the data fields decreases in a clockwise manner proceeding away from the sort-precedence indicator; and wherein the plurality of columns of the table are presented in an order according to the sort-precedence.

4. The method of claim 1, wherein the first data field is associated with first data elements and the second data field is associated with second data elements, the method further comprising:
determining that one or more of the first data elements or second data elements do not fit in the first section or the second section; and
presenting a scrolling indicator configured to scroll some of the first data elements into the first section or some of the second data elements into the second section.

5. An apparatus comprising:
one or more processors; and
a computer-readable storage device communicably coupled to the one or more processors, the computer-readable storage device having stored thereon instructions to cause the apparatus to:
present a circular user interface, wherein the circular user interface comprises a plurality of sections, the plurality of sections associated with a plurality of data fields of a data set;
present a visual representation of the data set as a table separate from the circular user interface, the table having a plurality of columns occupying a plurality of positions in the table, the plurality of columns associated with the plurality of data fields of the data set;
receive user input via the circular user interface, wherein the user input indicates a selection of a section of the circular user interface;
in response to user input, reconfigure the visual representation of the data set, wherein reconfiguration includes moving at least two of the columns to different of the plurality of positions in the table based, at least in part, on the selection of the section; and
present the visual representation of the data set consistent with the reconfiguration of the visual representation of the data set.

6. The apparatus of claim 5, wherein the instructions further cause the apparatus to present, in a section associated with a data field, a scrolling indicator and present a secondary user interface in proximity to the section having the scrolling indicator, the secondary user interface comprising a subset of a set of data field elements associated with the section in response to a determination that all of the set of data field elements associated with the data field cannot be displayed in the section associated with the data field;

wherein the subset of the set of data field elements are displayed in the secondary user interface as a circular list.

7. The apparatus of claim 6, wherein the subset of the set of data field elements is ordered, and wherein the instructions further comprise instructions to:

present an indication of the ordering of the subset of the set of data field elements in the section associated with the secondary user interface.

8. The apparatus of claim 6, wherein the secondary user interface comprises a semi-circular user interface.

9. The apparatus of claim 5, wherein the instructions further cause the apparatus to:

receive, via the circular user interface, an indication that a section of the circular user interface is to be hidden;

remove the section of the circular user interface; and remove a column from the table that is associated with a same data field as associated with the section of the circular user interface.

10. The apparatus of claim 5, wherein the instructions further cause the apparatus to:

receive, via the circular user interface, an indication to expand a previously hidden section to the circular user interface;

expand the circular user interface to include the previously hidden section; and insert a column into the table, the column associated with a same data field as associated with the previously hidden section.

* * * * *